UNITED STATES PATENT OFFICE.

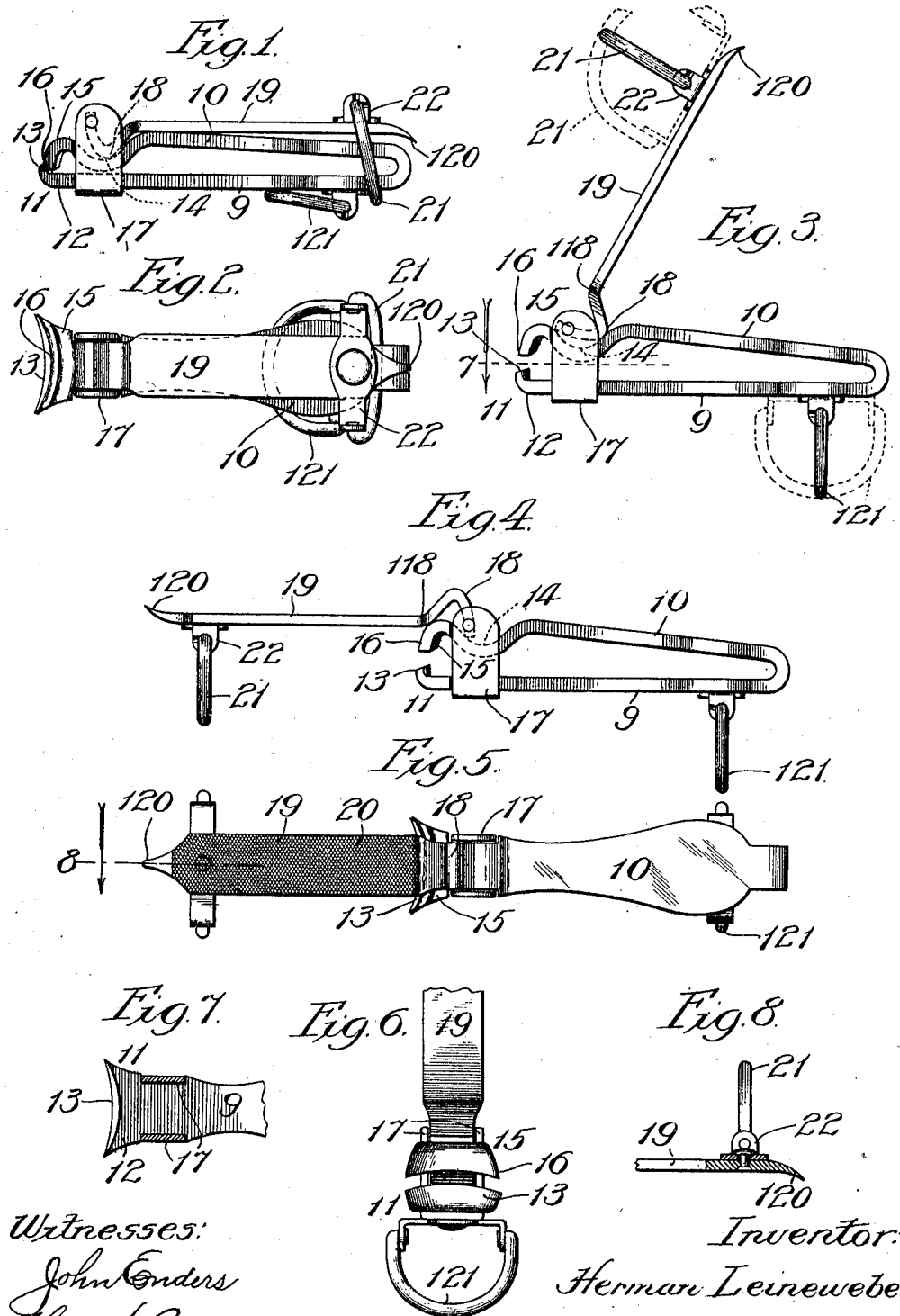

HERMAN LEINEWEBER, OF SOUTH CHICAGO, ILLINOIS.

NAIL-CLIPPER.

970,067. Specification of Letters Patent. Patented Sept. 13, 1910.

Application filed October 16, 1908, Serial No. 457,995. Renewed April 9, 1910. Serial No. 554,530.

*To all whom it may concern:*

Be it known that I, HERMAN LEINEWEBER, a citizen of the United States, residing at South Chicago, in the county of Cook and State of Illinois, have invented a new and useful Improvement in Nail-Clippers, of which the following is a specification.

My invention relates to improvements on the device in common use for cutting fingernails, involving a pair of cutting-jaws on the ends of handles compressible in the hand of the operator for working the jaws.

In the accompanying drawing, Figure 1 shows my improved device in the preferred embodiment of its detailed construction, by a view in side elevation and with the jaws in their closed condition; Fig. 2 is a top plan view of the same; Fig. 3 is a view like that presented in Fig. 1, but showing the device in condition for nail-clipping, with the jaws open, and Fig. 4, a similar view, but showing the operating lever turned to its extreme position for use as a nail-file; Fig. 5 is a top plan view of the device in its condition represented in Fig. 4; Fig. 6 is a broken view presenting the jaws in front elevation; Fig. 7 is a section on line 7, Fig. 3, showing the tapering form of the movable cutting-jaw, and Fig. 8 is a broken section on line 8, Fig. 5, showing the pivotal construction of a loop detail.

In the preferred form of the device shown, the two handles 9 and 10 are united, being formed of a strip of spring steel bent upon itself to cause the handle 10 to extend normally at a suitable inclination relative to the companion-handle and form the movable spring-retracted member of the device. However, it is not essential to my invention that the handles shall be united nor that they shall involve any spring-action. The handle 9 terminates at its forward end in an expanded jaw 11 consisting of a base-portion 12 and an upturned concave blunt-edged cutting-lip 13 slightly thinned or tapered toward its ends. The handle 10 contains a bend, forming a depression 14, near its forward end which terminates in an expanded jaw 15 having a blunt-edged cutting-lip 16 extending from it, of concave shape conforming to that of the lip 13, to coöperate with the rear portion of the edge of the latter for exerting the punching function hereinafter described in the manner of a cutting-die. A yoke 17 embraces the handle 9 adjacent to its jaw, being let into the recessed edges of the handle, and the arms of the yoke are similarly let into the edges of the handle 10 at the depression 14, beyond which is fulcrumed between said arms the cam-shaped end 18 of an operating lever 19 to cause the cam to engage the arm 10 at said depression. The under side of this lever is provided with a file-surface 20 and its free end is shown at 120 to be pointed to adapt it for nail-cleaning. A loop 21 is provided to extend from the outer face of the lever 19, being pivotally supported in the ends of a cross-head 22 pivotally fastened between its ends to the lever as represented in Fig. 8, and a similar loop 121 is secured in the same manner on the handle 9 near its rear end. To retain the device in its normal condition represented in Fig. 1, namely, with the jaws closed, wherein it is most compact, to adapt it to be carried in a pocket of the user's clothing, the pivotal loop on the lever may, on depressing the latter, be turned on its support 22 to surround the handles 9 and 10 near their rear or joined ends, the loop 121 being turned to lie against the outer surface of the handle 9. These loops, however, perform another function hereinafter described, for which they are adapted to be rotated by the pivotal connection of the cross-heads carrying them respectively with the operating lever and the handle 9.

To use the device, the described construction adapts it to be operated as follows, with the parts in the condition in which they are represented in Fig. 3: The operator inserts his thumb into the loop 21 and a finger of the same hand, preferably the middle finger, into the loop 121, the loops thus holding the device in the operator's hand and their pivotal connection with the device enabling the latter to be turned, as indicated by dotted lines in Fig. 3, to any desired angle relative to the operator's thumb and finger for facilitating access with the cutting-jaws to any part of a finger or toe nail to be clipped by working the lever 19 to actuate the jaw 15. In the operation of the device, the jaw 11 and handle 9 form the stationary member and the jaw 15 and handle 10 form the movable member. The stationary jaw performs, as one important function, that of a stop, by inserting its lip 13 underneath the nail being trimmed to gage the extent to which it may be cut by the jaw 15, and the thinned ends of that lip render accessible to it the corners of nails by adapting it to be inserted underneath them. With the jaw 11 thus applied to a nail to be trimmed, the lever 19 is operated to cause the cam 18 upon it to depress the arm 10 and thus actuate the jaw 15 to cut the nail to the extent gaged by the stop-function of the companion-jaw. It will be observed that the coöperation of the jaws is in the nature of punching as applied to die-cutting, inasmuch as the initial action of the blunt-edged cutter 15 upon the nail is to bend it over the edge of the cutter 11, and then to punch it against the latter, thereby rounding off the cut edge. This is an important advantage, since where, as in a form of nail-clipper known to me and in common use, the cutting edges meet coincidently in working the jaws they exert a chopping action on the nail which tends to split it; and this tendency is not wholly obviated by a mere shearing action of a sharp-edged cutting-jaw unless it exert the die-cut provided for in my improved construction. The action of the cam 18 is gaged to prevent an extent of the cutting stroke of the jaw 15 which would engage the cutting edge of the lip 16 with the base of the stationary jaw and thereby tend to dull that edge.

While a nail-file 20 on the operating lever in a nail-clipper in the class to which my invention relates is not new with me, it is my improvement in that connection to afford to the lever in the desirable straight position thereof of presenting its filing-surface for use, as represented in Figs. 5 and 6, a support sufficiently stable to resist the opposing pressure in using the file. In the construction illustrated the desirable degree of rigidity is afforded by the cam 18 finding, at the point 118 thereof, bearing against the back of the jaw 15.

What I claim as new and desire to secure by Letters Patent is—

1. In a nail-clipper of the character described, a relatively stationary member provided with a blunt-edged stop-forming cutting-jaw, and a member movable relative to said stationary member and provided with a blunt-edged cutting-jaw coöperating simultaneously throughout its length with said stop-jaw to exert a die-punching cutting action, for the purpose set forth.

2. In a nail-clipper of the character described, a relatively stationary member provided with a stop-forming cutting-jaw tapering to thinness toward its opposite ends, and a member movable relative to said stationary member and provided with a blunt-edged cutting-jaw having a concave cutting-edge conforming to that on said stop-jaw and coöperating therewith to exert a die-punching cutting action, for the purpose set forth.

3. In a nail-clipper of the character described, a relatively stationary member provided with a blunt-edged stop-forming cutting-jaw tapering to thinness toward its opposite ends, a member movable relative to said stationary member and provided with a blunt-edged cutting-jaw to exert a die-cutting action, and an operating-lever for said movable member, for the purpose set forth.

4. In a nail-clipper of the character described, the combination of a relatively stationary member provided with a cutting-jaw, a spring-member provided with a cutting-jaw coöperating with that of said stationary member, an operating lever for actuating said spring-member, and loops pivotally supported, respectively, on said lever and stationary member near their rear ends, for the purpose set forth.

5. In a nail-clipper of the character described, the combination of a relatively stationary member provided with a cutting-jaw, a spring-member provided with a cutting-jaw coöperating with that of said stationary member, an operating lever for actuating said spring - member, loop - supports pivotally fastened respectively on said lever and stationary member near their rear ends, and loops pivotally connected with said supports, for the purpose set forth.

6. In a nail-clipper of the character described, the combination of a relatively stationary member and a spring-member, said members terminating at one end of the device in coöperating cutting - jaws and the spring-member having a depression near the jaw thereon, a yoke embracing said members near their jaws, and an operating lever having a cam on one end and fulcrumed in said yoke to engage the cam with the spring-member at said depression, for the purpose set forth.

7. In a nail-clipper of the character described, the combination of a relatively stationary member and a spring-member, said members terminating at one end of the device in coöperating cutting-jaws and the spring-member having a depression forming a bearing near its jaws, a yoke embracing said members near their jaws, and a file-faced operating-lever having a cam on one end and fulcrumed in said yoke to engage the cam with the spring-member at said depression and to engage with said bearing when said lever is turned on its fulcrum to present its file-face outermost, for the purpose set forth.

HERMAN LEINEWEBER.

In presence of—
R. A. SCHAEFER,
J. G. ANDERSON.